Dec. 23, 1952     M. SCHLUMBERGER ET AL     2,623,083
ACCELERATION - INSENSITIVE MEASURING INSTRUMENT
Filed Aug. 1, 1947     2 SHEETS—SHEET 1
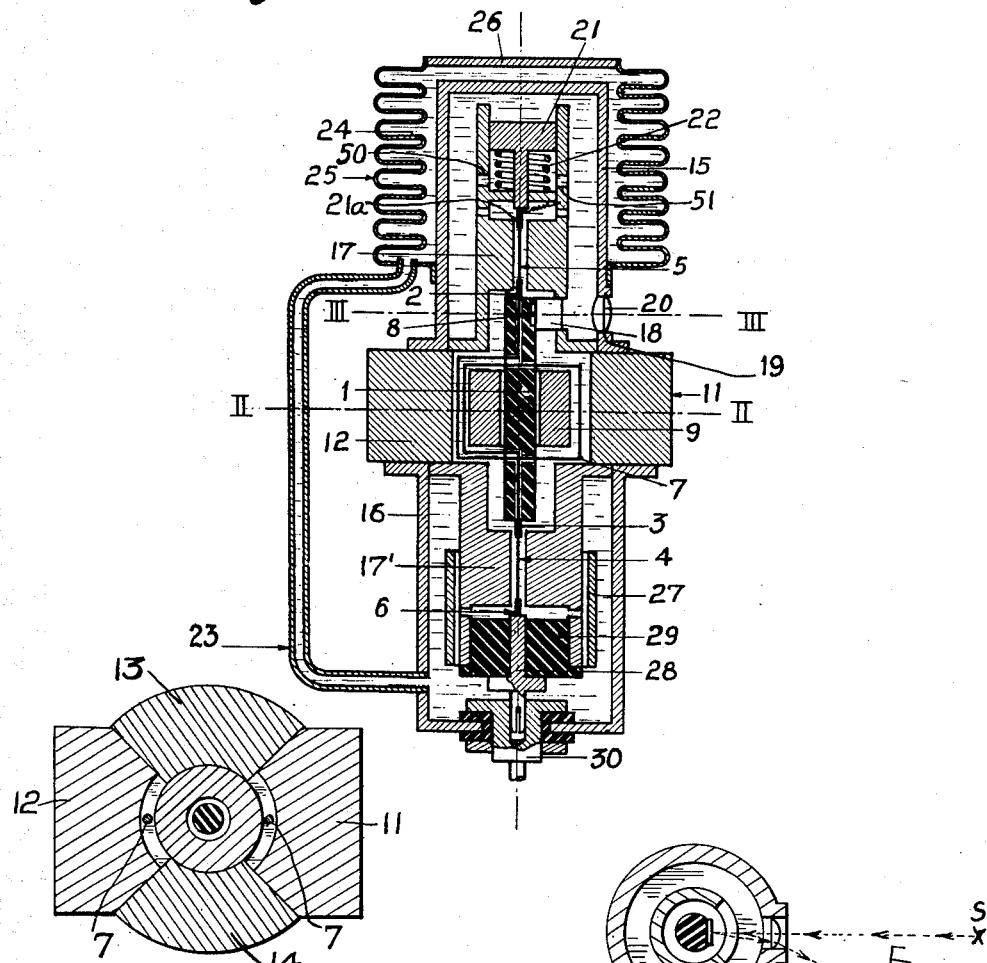
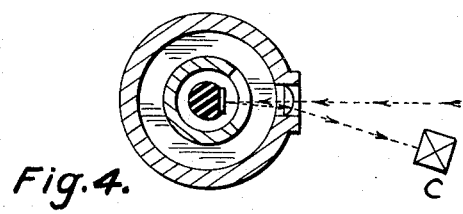
INVENTORS:
MARCEL SCHLUMBERGER
AND MAXIME FÉLIX BENOIT PICARD
BY:
Campbell, Brumbaugh & Free
THEIR ATTORNEYS Dec. 23, 1952  M. SCHLUMBERGER ET AL  2,623,083
ACCELERATION - INSENSITIVE MEASURING INSTRUMENT
Filed Aug. 1, 1947  2 SHEETS—SHEET 2

INVENTORS:
MARCEL SCHLUMBERGER
MAXIME FÉLIX BÉNOIT PICARD
BY:
Campbell, Brumbaugh & Free
THEIR ATTORNEYS Patented Dec. 23, 1952

2,623,083

UNITED STATES PATENT OFFICE 2,623,083

ACCELERATION-INSENSITIVE MEASURING INSTRUMENT

Marcel Schlumberger and Maxime F. B. Picard, Paris, France, assignors to Societe de Prospection Electrique Procedes Schlumberger, Paris, France, a corporation of France Application August 1, 1947, Serial No. 765,390
In France August 13, 1941

Section 1, Public Law 690, August 8, 1946
Patent expires August 13, 1961

8 Claims. (Cl. 171—95)

The present invention relates to measuring instruments, relays and other similar apparatuses, in particular those which comprise a movable element rotating around an axis, and whose movement, controlled by an external cause, is used either to measure said cause (as in the case of a galvanometer, ammeter, etc.), or to obtain a given mechanical result (in the case of a relay, the closing of an electric circuit). The primary object of the present invention is to render such instruments insensitive to shocks, vibrations and other accelerations. Another object of the said invention is to do away with stress on the connecting parts between the movable element and its casing. Still another object of the invention is to render possible the use of very delicate parts such as slender wire suspensions for connecting the movable element to its casing, even in the case of instruments subject to accelerations, vibrations or shocks, thus considerably, increasing the sensitiveness of these apparatuses.

Another object of the invention is to ensure extreme stability of the deviations in indicating apparatuses (luminous spot), which permits photographic recording of the deviations even under extremely unfavourable mechanical conditions.

Other objects, advantages and characteristics of the present invention will appear in the course of the following description, referring to the attached drawings, which show diagrammatically and as a non-limiting example, particular embodiments of the present invention.

Fig. 1 is a diagrammatic vertical section of a galvanometer in accordance with the invention.

Fig. 2 is a transversal section along line II—II of Fig. 1.

Fig. 3 is a transversal section along line III—III of Fig. 1.

Fig. 4 is a similar view of a modification showing the same apparatus used as a relay.

Figure 5:
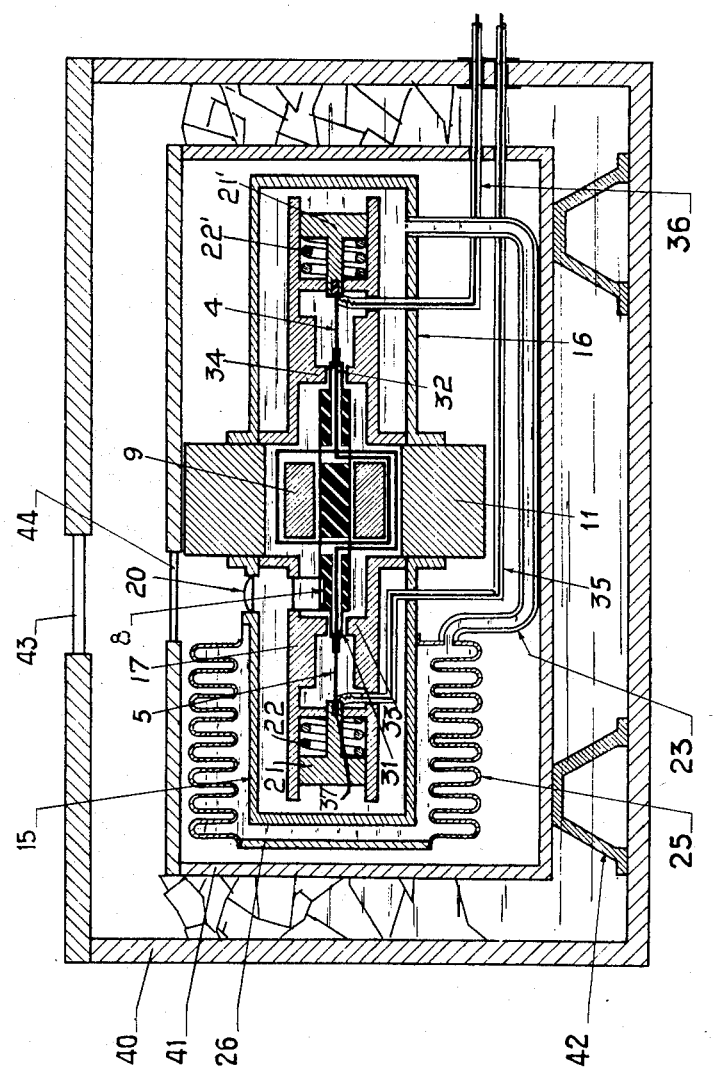
Fig. 5 is a diagrammatic view of the suspension device used in the case of an instrument under the control of a thermostat.

In Fig. 1, the movable element of the galvanometer comprises a cylinder 1 of plastic matter used as a float, connected to the casing of the apparatus by wires 4 and 5 fastened to either end. Wire 4 is directly fastened to the casing at 6, whereas wire 5 is connected to the casing by an elastic device which will be described hereafter. The winding of the movable element supported by cylinder 1 is shown at 7. It comprises a number of appropriate loops of which only two are shown on the drawing.

The upper part of cylinder 1 supports a reflecting mirror 8 which projects on to a screen, in the usual way, a luminous pencil coming from a source of light S, the movements of this pencil corresponding to the rotation movements of the said mirror and thus of the entire movable element, 9 is an iron core placed inside winding 7, and 11 and 12 the soft iron polar masses which act as magnets and create a magnetic field in which the movable element moves.

In accordance with the invention, the movable element formed by cylinder 1, winding 7 and suspension wires 5 and 6, attached to casing 17—17', is immersed in a liquid contained in a vessel constituted by polar masses 11 and 12 welded to parts 13 and 14 of non-magnetic metal and to hoods 15 and 16. The liquid is preferably of fairly high density and with a low viscosity coefficient, such as carbon tetrachloride, for instance. The movable element is furthermore constituted in such a way as to be of equal density with the liquid in which it is plunged, at a temperature of 15° C. for instance. Furthermore, the centre of gravity of the body of liquid in which the movable element is immersed coincides as far as possible with the centre of gravity of the said movable element.

In casing 17 an opening 18 is provided at the level of mirror 8, an opening 19 closed by a lens 20 being found at the same height in hood 15. These openings allow the passage of the incidental and reflected luminous rays (Fig. 3) which coming from a source of light S are projected by the mirror on to a scale or dial D (Fig. 2).

The elastic device connecting suspension wire 5 to the casing is placed on the upper part of said casing 17. This device comprises for example a piston 21 sliding in a chamber 18a formed in the upper end of the part 17 and bearing at the end of its rod, means 21a for fastening suspension wire 5. This piston is constantly forced upwards by a spring 22. Piston 21 and the tightening parts for wire 5 are such that the whole is of an average density equal to that of the liquid in which it is immersed.

In this way the tension on wires 4 and 5 is constant under all circumstances and equal to the tension of spring 22, and the fastening means 21a being of the same density as the liquid, this tension cannot be increased by accelerations of the vibrations or by shocks.

It may be noted that in practice the upper and lower suspension fastenings will usually be fitted with orienting and regulating parts near the top of the element, not shown on the drawings for the sake of clearness.

A pipe 23 terminates at the bottom of hood 16 and communicates with a reservoir 24 surrounding for example the top of hood 15. This reservoir 24 is expandible, constituted for example by a thermostatic membrane 25 welded to hood 15 and closed at the top by a rigid plate 26. The lower part of casing 17' is furthermore fitted with a protecting tube 27. These different parts work as follows.

The electric current reaches winding 7 by means of suspension wires 4 and 5, in the following manner. Suspension wire 5 is connected to the body of the apparatus, wire 4 is connected at 6 by a clip to rod 28 insulated from the earth by part 29. This rod 28 extends into a socket 30 which passes through hood 16 by means of an insulating connection and constitutes the out terminal of the apparatus. The earthing of the upper suspension has the double advantage of greatly simplifying the electric set up and suppressing any electrostatic effect between the casing and the earth.

The apparatus described above works as follows: from an electrical point of view, it is the usual type of mirror galvanometer set up in such a way that the movements of the luminous spot reflected by the mirror are proportional to the current passing through the movable element. It must be noted, however, and this constitutes one of the important advantages of the present invention, that the angle of deviation of the ray reflected by the mirror is multiplied by the refractive index of the liquid in which the mirror is immersed (see Fig. 3) due to the fact that the refractive index in question is different to that of the air. The refractive indices of the liquids used being comprised generally between 1.3 and 1.5, the resulting increase in sensitiveness is 30 to 50%.

Furthermore, due to the fact that the movable element is immersed in a liquid and is of the same average density as this liquid, and to the fact that its centre of gravity coincides with the centre of gravity of the space it occupies in the body of liquid in which it is immersed, all the impulsions, forces, or accelerations brought to bear on the apparatus as a whole create no inertia between the movable element and its casing, so that the suspension of this movable element is not affected by the shocks, vibrations etc. to which the apparatus as a whole may be subjected.

Also due to the fact that the suspension wire is not connected directly to the casing at both ends, but is connected at one end by means of the elastic device 21—22, no force of traction or pressure can be brought to bear on this wire due to variations in the temperature, or of accidental traction or pressure on one of the ends of the casing.

The role of the expansion vessel described is as follows:

The apparatus containing a closed vessel completely filled with liquid, the dilation of this liquid even for a small change in temperature would cause extremely high pressure on the walls of the vessel. In order to avoid this, in accordance with the invention a dilatable expansion vessel 24 is provided, and allows the liquid to dilate freely without exerting undue pressure on the walls of the vessel in the case of an increase in temperature. In accordance with the invention this dilatable vessel 24 is placed at one end of the apparatus and connected by pipe 23 to the other end of the apparatus, for the following reason.

In the case of violent accelerations directed from top to bottom (the upper end of the apparatus hitting the ground for instance) the immersion liquid will tend by inertia to flow towards the top. The liquid contained in the receiver constituted by parts 12—13—14—15—16 cannot move, since the upper hood 15 is hermetically closed. The only result is extra pressure on the walls of hood 15. The dilation of membrane 25 is caused solely by the liquid contained in the bottom of hood 16, in pipe 23 and vessel 24. If the acceleration reaches such a point that the pressure on the bottom of hood 16 becomes less than the maximum vapour pressure of the liquid, part of the liquid will be vaporized at the bottom of hood 16, and a flow of liquid caused in pipe 23. When the disturbing acceleration decreases and is annulled, the elasticity of membrane 25 returns the liquid in vessel 24 to hood 16, through pipe 23, condensing the vapour formed in this part. It is clear that if membrane 25 is constantly stretched, it is impossible that a flow of liquid should exist elsewhere than in pipe 23, and in particular only a very small flow can be found in the liquid contained in 12—13—14—15—16, this flow being due to the compressibility of the liquid (always extremely small) or to whirl movements; the latter have no effect on the element and suspensions due to the excessive partitioning and the small quantity of liquid surrounding these parts.

With the return of the liquid to the bottom of 16, an exceedingly violent whirl is formed there, which may damage the very fragile suspension 4 at 6. In order to obviate this possibility, the bottom of casing 17' could be fitted with a wall 27. The play between this wall 27 and the casing 17' is sufficient to allow the passage of the liquid resulting from the dilation of the liquid contained in hood 15 and inside casing 17, but is not sufficient for the transmission of the violent whirling movements arising in the lower part of 16.

Let us now suppose a violent acceleration directed from bottom to top. The effect of inertia serves only to increase the pressure on the walls of the vessels, and in this case also no flow of liquid can take place in the neighbourhood of the movable element and suspensions. The same can be said of transversal accelerations.

The apparatus as described above is intended to be a deflection mirror galvanometer. The same apparatus may be used as a relay. The only modification consists in replacing scale D by an electric cell C controlling the electric circuit. When the movable element of the apparatus is deflected with sufficient amplitude, the reflected pencil of rays is projected on to the electric cell, which is then brought into operation.

In the above description we have supposed the apparatus to be a vertical suspension apparatus 5—6 vertically oriented in the direction shown on the figure.

In practice, and this constitutes one of the characteristics and advantages of the present invention; such apparatus works equally well in any position, and particularly horizontally. This may be of great advantage in certain cases, and thanks to this property, such an apparatus may be mounted on any vehicle, ship or aeroplane, and will work in any position.

Fig. 5 shows diagrammatically a horizontal suspension device in accordance with the invention, designed to work under the control of a thermostat. The role of this thermostat is as follows:

In the device already described, the movable element is constituted in such a way that it is in perfect equilibrium for a given temperature, 15° C. for instance. But when the surrounding temperature deviates from this figure, a slight disequilibrium is produced, due to the difference in the dilation of the movable element and that of the liquid in which it is immersed. To prevent this disequilibrium in a very sensitive apparatus, the latter is immersed in a thermostat.

The device in Fig. 5 is similar to that which has just been described, differing only on the following points:

This set up is designed to be placed inside a thermostat of any appropriate type. In practice a thermostat with melting ice is used, this being an extremely simple arrangement which ensures a constant temperature as perfectly as possible.

In Fig. 5, this thermostat is constituted by a box 40 filled with water and ice, and containing a second box 41, supported inside said box 40 by support 42, and containing the casing of the apparatus. Openings 43 and 44 respectively provided in the top of boxes 40 and 41 and closed by lenses, allow the passage of the luminous rays to or from mirror 8. As in the preceding case, the movable element 1 is suspended on suspension wires 4 and 5, but, contrary to the former case, both suspension wires are elastically attached to the casing by means of piston and spring devices 21—22, 21'—22', fitted with attaching members 37 of insulating matter. Furthermore, at the two ends attached to wires 4 and 5, the movable element is fitted with two trunnions 31—32 which pivot on two bearings 33—34 forming part of the body of the apparatus, leaving a certain amount of play. The device is regulated in such a way that when the thermostat is in operation and therefore the set up at the desired temperature, trunnions 31—32 are free inside their bearings, the movable element rotating only on suspension wires 4 and 5. When the thermostat is no longer working, the trunnions rest on the bearings and maintain the movable element so that the suspension wires 4 and 5 run no risk of being broken.

The current is supplied to the movable element in any appropriate manner, for example as shown, by means of insulated wires 35—36.

In the case of an apparatus designed to operate vertically, the bearings and trunnions shown can be replaced by conical pivots and corresponding stops.

As in the preceding case, the same instrument can be used as a relay, for the mechanical closing of a circuit for instance, by means of a low current passing through the movable element. Since the apparatus is insensitive to shocks and vibrations, and is therefore in no danger of being brought into operation violently by the effect of such a shock or vibration, it may be made extremely sensitive. For the same reason it is exceedingly reliable.

In the examples described, the measurement (in the case of a galvanometer) or the mechanical control (in the case of a relay) is brought about by a pencil of rays coming into contact with a mirror. It is clear that any other appropriate device may be used, particularly a direct contact apparatus following the rotation movements of the movable element and giving the desired result.

Numerous other changes may be applied without going beyond the sphere of the present invention.

As regards the liquid in which the movable element is immersed, as already stated, it may be of any kind, but an insulating liquid with a fairly high density and a relatively low viscosity index will be chosen preferably. The principal role of this liquid is not, as in the case of certain apparatuses, to oppose viscous resistance to the rotation movement of the movable element so as to dampen this movement. On the contrary it is usually preferable that the resistance to friction of the movable element inside the liquid should be as low as possible so as to increase the velocity of indication of the apparatus. The dampening of the movable element is preferably obtained, in a known manner, by electromagnetic effect on the coil. However, should it be desired also to dampen the movement of the element by friction inside the liquid, a more viscous liquid may be used.

It must further be noted that vessel 12 and the adjoining vessels must be very carefully filled so as to avoid the presence of gas bubbles which may tend to disturb the working of the apparatus.

Although the embodiments described above have been limited to the application of the invention to galvanometers, it is evident that the invention applies as it stands to all measuring instruments of whatever nature. It can be used in particular for geophysical measuring instruments (magnetic balances, torsion balances, etc.).

What we claim is:

1. In combination, an elongated, enclosed casing, closed expansion chamber means mounted at one end of said casing, conduit means providing communication between the interior of said expansion chamber means and the interior of the other end of said casing, a liquid filling said casing, expansion chamber means and conduit means, a movable element mounted for rotation in the liquid in said casing with its center of gravity substantially in coincidence with the center of gravity of the space it occupies in the liquid, the average density of said movable element being substantially the same as the density of said liquid, and means for utilizing the movements of the movable element.

2. In combination, an elongated, enclosed casing, closed expansion chamber means mounted at one end of said casing, conduit means providing communication between the interior of said expansion chamber means and the interior of the other end of said casing, a liquid filling said casing, expansion chamber means and conduit means, a movable element, means suspending said element from the casing for rotation in the liquid in said casing with its center of gravity substantially in coincidence with the center of gravity of the space it occupies in the liquid, said suspending means including yieldable tensioning means, the average density of said movable element being substantially the same as the density of said liquid, and means for utilizing the movements of the movable element.

3. In combination, an elongated, enclosed casing, closed expansion chamber means mounted at one end of said casing, conduit means providing communication between the interior of said expansion chamber means and the interior of the other end of said casing, a liquid filling said casing, expansion chamber means and conduit means, means forming an auxiliary chamber within said casing and having passages terminating in port means providing communication between said auxiliary chamber and the opposite ends of said casing, baffle means mounted over the port means at one end of said casing, a movable element, means suspending said element from the casing for rotation in the liquid in said auxiliary chamber with its center of gravity substantially in coincidence with the center of gravity of the space it occupies in the liquid, said suspending means including yieldable tensioning means, the average density of said movable element being substantially the same as the density of said liquid, and means for utilizing the movements of the movable element.

4. In combination, an elongated, enclosed casing, closed expansion chamber means mounted at one end of said casing, conduit means providing communication between the interior of said expansion chamber means and the interior of the other end of said casing, a liquid filling said casing, expansion chamber means and conduit means, a pair of support members mounted in said casing and extending outwardly towards the opposite ends of said casing, respectively, said support members cooperating to form an auxiliary chamber within the casing and intermediate the ends thereof, means forming passages in said support members terminating in port means providing communication between said auxiliary chamber and the opposite ends of said casing, a movable element mounted in said auxiliary chamber with its center of gravity substantially in coincidence with the center of gravity of the space it occupies in the liquid, the average density of said movable element being substantially the same as the density of said liquid, suspension elements connecting said movable element to said respective support members for rotation in the liquid in said auxiliary chamber, at least one of said suspension elements including yieldable tensioning means, baffle means mounted in said casing between the location where said conduit means enters said expansion chamber and the port means in the adjacent support member, and means for utilizing the movements of the movable element.

5. The combination defined in claim 1 together with means for maintaining the casing and the contents thereof at a substantially constant temperature.

6. The combination defined in claim 1 in which the liquid in which the movable element is immersed in carbon tetrachloride.

7. The combination defined in claim 1 in which the movable element comprises the movable coil of a galvanometer, and magnet means are provided to establish a magnetic field for said coil.

8. The combination defined in claim 1 in which the movable element comprises the movable coil of a galvanometer carrying a reflector element thereon adapted to cooperate with a source of light to provide a visible deflection, the casing is provided with a window through which light may have access to and from said reflector element, and magnetic pole means are provided for establishing a magnetic field for said movable coil.

MARCEL SCHLUMBERGER.
MAXIME F. B. PICARD.

REFERENCES CITED

The following references are of record in the file of this patent:

UNITED STATES PATENTS

| Number | Name | Date |
|---|---|---|
| 531,970 | Rowland | Jan. 1, 1895 |
| 1,642,515 | Simons | Sept. 13, 1927 |
| 1,864,586 | Ferranti | June 28, 1932 |
| 1,894,111 | Marcellus | Jan. 10, 1933 |
| 2,016,247 | Simmons | Oct. 1, 1935 |
| 2,024,966 | Chilowsky | Dec. 17, 1935 |
| 2,057,845 | Pattee | Oct. 20, 1936 |
| 2,102,145 | Fallou | Dec. 14, 1937 |
| 2,149,442 | Kannenstine | Mar. 7, 1939 |
| 2,218,140 | Wright et al. | Oct. 15, 1940 |
| 2,433,554 | Herzog | Dec. 30, 1947 |

FOREIGN PATENTS

| Number | Country | Date |
|---|---|---|
| 878,079 | France | Sept. 21, 1942 |